United States Patent
Janssen

(10) Patent No.: US 7,146,562 B2
(45) Date of Patent: Dec. 5, 2006

(54) METHOD AND COMPUTER SYSTEM FOR DISPLAYING A TABLE WITH COLUMN HEADER INSCRIPTIONS HAVING A REDUCED HORIZONTAL SIZE

(75) Inventor: Ocke Janssen, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 506 days.

(21) Appl. No.: 10/134,073

(22) Filed: Apr. 26, 2002

(65) Prior Publication Data

US 2002/0158876 A1    Oct. 31, 2002

(30) Foreign Application Priority Data

Apr. 30, 2001    (EP)    .................... 01110595

(51) Int. Cl.
G06F 15/00    (2006.01)
G06F 17/00    (2006.01)

(52) U.S. Cl. ............... 715/504; 715/503; 715/509

(58) Field of Classification Search ............... 715/504, 715/503, 509
See application file for complete search history.

(56) References Cited

U.S. PATENT DOCUMENTS

| | | | | |
|---|---|---|---|---|
| 5,001,697 A * | 3/1991 | Torres | ................ | 715/542 |
| 5,231,577 A * | 7/1993 | Koss | ................ | 715/504 |
| 5,425,138 A | 6/1995 | Kumakawa | | |
| 5,450,536 A | 9/1995 | Rosenberg et al. | | |
| 5,588,099 A * | 12/1996 | Mogilevsky et al. | ........ | 715/508 |
| 5,604,854 A * | 2/1997 | Glassey | ................ | 715/503 |
| 5,621,876 A * | 4/1997 | Odam et al. | ................ | 715/504 |
| 5,768,606 A * | 6/1998 | Sharp | ................ | 715/509 |
| 5,808,914 A * | 9/1998 | Shin et al. | ................ | 703/2 |
| 5,835,916 A * | 11/1998 | Inaki et al. | ................ | 715/509 |
| 5,847,706 A * | 12/1998 | Kingsley | ................ | 715/788 |
| 6,044,383 A * | 3/2000 | Suzuki et al. | ................ | 715/509 |
| 6,055,550 A * | 4/2000 | Wallack | ................ | 715/509 |
| 6,185,582 B1 * | 2/2001 | Zellweger et al. | ................ | 715/503 |
| 6,256,649 B1 * | 7/2001 | Mackinlay et al. | ................ | 715/503 |
| 6,313,848 B1 * | 11/2001 | Hoag | ................ | 345/684 |
| 6,369,836 B1 * | 4/2002 | Larson et al. | ................ | 715/763 |
| 6,415,305 B1 * | 7/2002 | Agrawal et al. | ................ | 715/503 |
| 6,442,575 B1 * | 8/2002 | Pratley et al. | ................ | 715/503 |
| 6,584,479 B1 * | 6/2003 | Chang et al. | ................ | 715/512 |

(Continued)

OTHER PUBLICATIONS

Harvey, Greg, et al., Microsoft Office 2000: 9 in 1 for Dummies, Wiley Publishing, Inc., Indianapolis, IN, © 1999, pp. 242-246.*

(Continued)

Primary Examiner—Shahid Alam
Assistant Examiner—Robert Stevens
(74) Attorney, Agent, or Firm—Gunnison, McKay & Hodgson, L.L.P.; Lisa A. Norris

(57) ABSTRACT

The header inscription of one or more columns in a data table is reduced in horizontal width. A user having input to a first view of a data table can select a desired column at any location in the column to reduce the horizontal width of the header inscription. The header inscription is reduced in horizontal width, and a second view of the data table is displayed in which the header inscription of the selected column has reduced horizontal width. The header inscriptions of some or all columns in the data table can also be reduced in horizontal width by selection of a single column. Further, the header inscription style utilized in the reduction of the horizontal width can be user selected.

35 Claims, 15 Drawing Sheets

U.S. PATENT DOCUMENTS

| | | | |
|---|---|---|---|
| 6,981,209 B1 * | 12/2005 | Parikh et al. | 715/509 |
| 2001/0017622 A1 * | 8/2001 | Patel et al. | 345/418 |
| 2002/0129055 A1 * | 9/2002 | Agrawal et al. | 707/504 |
| 2003/0097318 A1 * | 5/2003 | Yu et al. | 705/35 |

OTHER PUBLICATIONS

Hallberg, Bruce, et al., Special Edition Using Microsoft Excel 97, Bestseller Edition, Que Corporation, Indianapolis, IN, © 1997, pp. 158-163.*

Microsoft Computer Dictionary, 4th Edition, Microsoft Press, Redmond, WA, © 1999, pp. 79, 83, 191-192, 345 and 347.*

Courter, Gini, et al., Mastering Microsoft Office 2000: Professional Edition, Sybex, Inc., Alameda, CA, © 1999, pp. 567-569.*

Kelly, Julia, Using Microsoft Excel 2000, Que Corporation, Indianapolis, IN, © 1999, pp. 84-86, 221-232, 258-265, 501-503 and 507-509.*

Hudson, Scott E., "User Interface Specification Using an Enhanced Spreadsheet Model", ACM Transactions on Graphics, vol. 13 No. 3, Jul. 1994, pp. 209-239 [ACM 0730-0301/94/0700-0209].*

Spenke, Micahel, et al., "FOCUS: The Interactive Table for Product Comparison and Selection", UIST '96, Seattle, WA, © 1996, pp. 41-50.*

XP-002180858—"Excerpts from the Microsoft Excel 2000 Online Help", © 1999.

XP-000728615—"Focus: The Interactive Table for Product Comparison and Selection", Spenke M. et al. UIST 1996; 9th Annual Symposium on User Interface Software and Technology; Proceedings of the ACM Symposium on User Interface Software and Technology; Seattle, WA, Nov. 6-8, 1996, ACM Symposium on User Interface Software and Technology, New York, NY, Nov. 6, 1996, pp. 41-50.

* cited by examiner

| Year | USA | Canada | Germany | United Kingdom |
|------|-----|--------|---------|----------------|
| 1995 | 155 | 23     | 57      | 8              |
| 1996 | 128 | 18     | 61      | 11             |
| 1997 | 179 | 29     | 64      | 14             |
| ...  | ... | ...    | ...     | ...            |

Display 102

FIG. 1
(PRIOR ART)

| 414_1 | 414_2 | 414_3 | 414_4 | 414_5 |
|---|---|---|---|---|
| Year | USA | Canada | Germany | United Kingdom |
| 1995 | 155 | 23 | 57 | 8 |
| 1996 | 128 | 18 | 61 | 11 |
| 1997 | 179 | 29 | 64 | 14 |
| ... | ... | ... | ... | ... |

Display 402 — 410A 418A, 420A, 404

FIG. 4A

| 414_1 | 414_2 | 414_3 | 414_4 | 414_5 |
|---|---|---|---|---|
| Year | USA | Canada | Germany | United Kingdom |
| 1995 | 155 | 23 | 57 | 8 |
| 1996 | 128 | 18 | 61 | 11 |
| 1997 | 179 | 29 | 64 | 14 |
| ... | ... | ... | ... | ... |

Display 402 — 410B 418B, 420B, 404

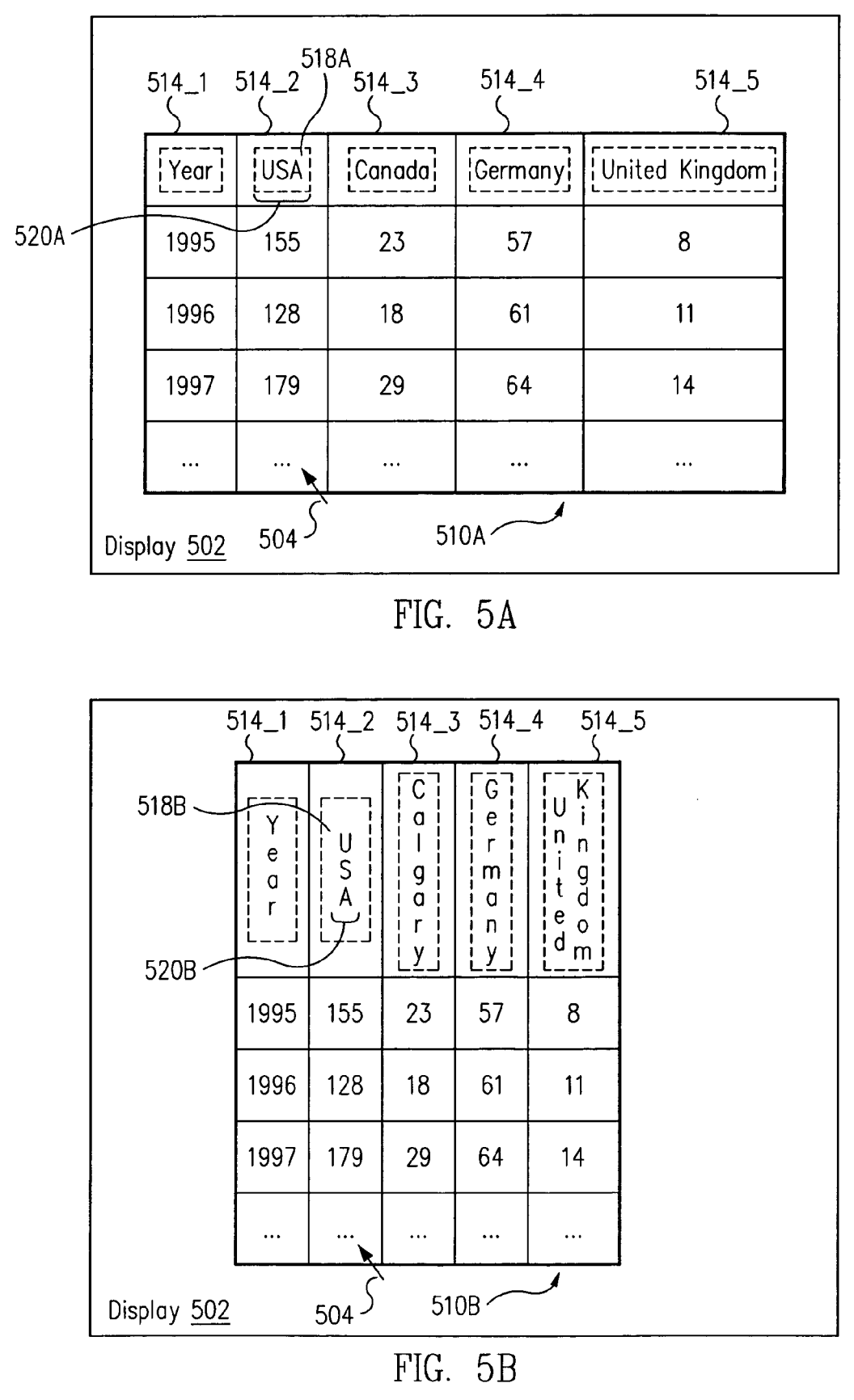

| Year | USA | Canada | Germany | United Kingdom |
|------|-----|--------|---------|----------------|
| 1995 | 155 | 23 | 57 | 8 |
| 1996 | 128 | 18 | 61 | 11 |
| 1997 | 179 | 29 | 64 | 14 |
| ... | ... | ... | ... | ... |

FIG. 5B

| Year | USA | Calgary | Germany | United Kingdom |
|------|-----|---------|---------|----------------|
| 1995 | 155 | 23 | 57 | 8 |
| 1996 | 128 | 18 | 61 | 11 |
| 1997 | 179 | 29 | 64 | 14 |
| ... | ... | ... | ... | ... |

| Year | USA | Canada | Germany | United Kingdom |
|------|-----|--------|---------|----------------|
| 1995 | 155 | 23 | 57 | 8 |
| 1996 | 128 | 18 | 61 | 11 |
| 1997 | 179 | 29 | 64 | 14 |
| ... | ... | ... | ... | ... |

FIG. 6A

| Year | USA | Canada | Germany | United Kingdom |
|------|-----|--------|---------|----------------|
| 1995 | 155 | 23 | 57 | 8 |
| 1996 | 128 | 18 | 61 | 11 |
| 1997 | 179 | 29 | 64 | 14 |
| ... | ... | ... | ... | ... |

| Year (718A, 720A) | USA | Canada | Germany | United Kingdom |
|---|---|---|---|---|
| 1995 | 155 | 23 | 57 | 8 |
| 1996 | 128 | 18 | 61 | 11 |
| 1997 | 179 | 29 | 64 | 14 |
| ... | ... | ... | ... | ... |

714_1, 714_2, 714_3, 714_4, 714_5
704, Display 702, 710A

FIG. 7B

| Year (718B, 720B) | USA | Canada | Germany | United Kingdom |
|---|---|---|---|---|
| 1995 | 155 | 23 | 57 | 8 |
| 1996 | 128 | 18 | 61 | 11 |
| 1997 | 179 | 29 | 64 | 14 |
| ... | ... | ... | ... | ... |

714_1, 714_2, 714_3, 714_4, 714_5
704, Display 702, 710B

|   814_1  |  814_2  |  814_3  |  814_4   |   814_5        |
|----------|---------|---------|----------|----------------|
| Year     | USA     | Canada  | Germany  | United Kingdom |
| 1995     | 155     | 23      | 57       | 8              |
| 1996     | 128     | 18      | 61       | 11             |
| 1997     | 179     | 29      | 64       | 14             |
| ...      | ...     | ...     | ...      | ...            |

FIG. 8A

|   814_1  |  814_2  |  814_3  |  814_4   |   814_5        |
|----------|---------|---------|----------|----------------|
| Year     | USA     | Canada  | Germany  | United Kingdom |
| 1995     | 155     | 23      | 57       | 8              |
| 1996     | 128     | 18      | 61       | 11             |
| 1997     | 179     | 29      | 64       | 14             |
| ...      | ...     | ...     | ...      | ...            |

FIG. 8B

|  | 1114_1 | 1114_2 | 1114_3 | 1114_4 | 1114_5 | 1114_6 |
|---|---|---|---|---|---|---|
|  | [Articles] | [Books] | [CDs] | [Newspapers] | [Magazines] | [Videotapes] |
| A | — | 10,000 | — | 50,000 | — | — |
| B | — | — | — | 100,000 | 10,000 | 0 |
| C | — | — | 1,000 | — | — | — |
| D | — | 50,000 | — | — | — | — |
| E | — | 100,000 | — | — | — | — |

○ Reduce header inscription of selected column

● Reduce header inscription of all columns

○ Cancel

FIG. 11B

METHOD AND COMPUTER SYSTEM FOR DISPLAYING A TABLE WITH COLUMN HEADER INSCRIPTIONS HAVING A REDUCED HORIZONTAL SIZE

BACKGROUND OF THE INVENTION

1. Field of the Invention

The present invention relates generally to the display of data in data tables, such as spreadsheets, presentation texts, etc. More particularly, the present invention relates to display of the header inscriptions of one or more columns in a data table.

2. Description of Related Art

It is often useful to represent data in the form of a data table. Conventionally, data tables include a plurality of cells arranged in horizontal rows and vertical columns. Each of the columns and/or rows typically contain a cell describing the content of the cells of the column and/or row, such as a parameter in a spreadsheet table, a time period, or geographical area in a table of a text or a presentation document.

The cells describing the content of each of the columns of the data table are often arranged in one row located in the first row of the data table, although they can also be located at the last row of the data table or at some other position within each of the columns. The description of the content of each of the columns is termed the header inscription.

A header inscription can take any of a variety of forms, such as alphabetic, numeric, alphanumeric, symbolic, or of some other form representative of the column contents. A header inscription can be of varying length, and is frequently of a different length from that of the contents of the cells within the column. In some instances, the header inscription occupies more horizontal space, e.g., horizontal width, than the contents of the cells within the column. When this occurs, the horizontal width of the header inscription often results in the column occupying a larger horizontal space in the data table than the contents of cells in the column require. If a data table is being viewed in a display area of fixed size, such as on a page or display screen, this results in a less than optimal utilization of the display area.

Figure 1:
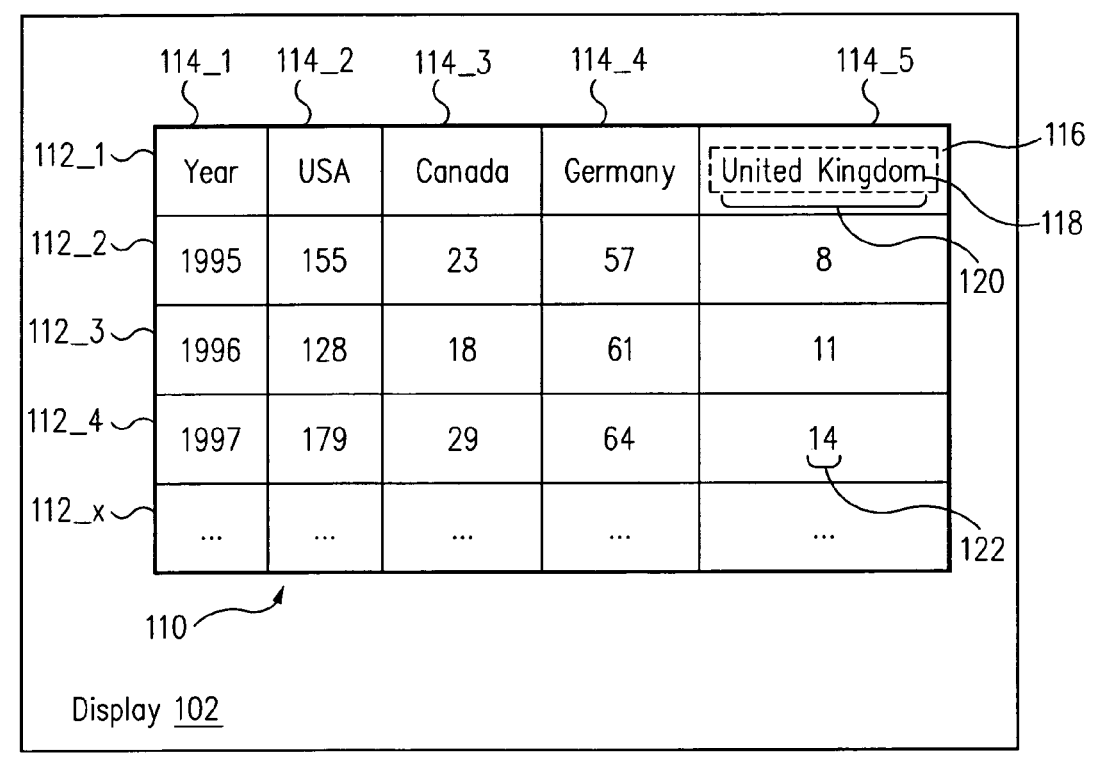

FIG. 1 illustrates an example of a conventional data table found in the prior art. As illustrated, the data table 110 may depict sales figures of a product in four different countries over a certain period of time. The rows represent years and the columns the respective countries.

As illustrated, the data table 110 contains rows 112_1 through 112_x, and columns 114_1 through 114_5. Each of the columns 114_1 through 114_5 contain a cell having a header inscription. For example, column 114_5 includes a cell 116 having a header inscription 118. In the present illustration, the contents of header inscription 118, "United Kingdom", utilizes a greater horizontal width 120 than the largest of the contents of the cells in the column 114_5, horizontal width 122.

When data tables containing a large number of columns are to be viewed on a display, it may not be possible for all columns of the data table to be shown simultaneously on the display due to the fixed display size. To view all the columns in the entire data table, it may be necessary for a user to scroll the view of the data table in the horizontal direction. Although horizontal scrolling permits the earlier unviewed columns to be viewed within the display, it does not permit all the columns to be viewed on the display simultaneously, as some of the earlier viewed columns may now be unviewable.

The time and effort associated with scrolling through partial views of a data table is sometimes viewed as undesirable by users. Thus, many users attempt to reduce the horizontal width occupied by individual columns to simultaneously view more columns in the data table. As the width of the largest contents of a column cell is usually determinative of the column width, users attempt to locate ways to reduce the size of the contents of the cells.

One technique currently used to reduce the size of the header inscription contents of a cell is to locate and select the header inscription of a column and modify the text. As one example, a user would position a cursor, or other indicator, on the header inscription to be modified, and then select, such as by highlighting or clicking on the header inscription, the portion of the header inscription to be modified. The user would then relocate the cursor to a tool bar on the display screen and locate a formatting option, such as change font size, rotate text, wrap text, etc., to be applied to the selected header inscription. The user would then select the formatting option. This process can be repeated or other formatting options selected each iteration. In this example, the user must locate and select the desired header inscription to be modified, and then move to a tool bar to select a formatting option.

If a user is currently working in another portion of the data table, e.g., not at the header inscription, the user must leave the area of the data table in which he/she is working, and relocate the cursor to the header inscription to be modified, as well as to any associated tool bar needed to effect the modification. In large data tables, this can be very time consuming and disruptive to a user, as the current project in the data table must be interrupted and the cursor relocated to the header inscription in the data table. In some instances, this may require that the user scroll the data table vertically and/or horizontally to locate the desired header inscription.

SUMMARY OF THE INVENTION

According to the principles of the present invention, there are provided methods, products and systems for reducing the horizontal width of a header inscription of a column in a data table.

According to one embodiment, a computer-based method for reducing a horizontal width of a header inscription of a column in a data table includes: displaying a first view of a data table, the data table having at least a plurality of columns, wherein at least one column includes a cell containing a header inscription having a first horizontal width; selecting at least one column including a header inscription having a first horizontal width; reducing the first horizontal width of the header inscription of the at least one column to a second horizontal width, the second horizontal width being less than the first horizontal width; and displaying a second view of the data table, wherein the header inscription of the at least one column has the second horizontal width.

In some embodiments, selecting at least one column including a header inscription having a first horizontal width further includes positioning a cursor at any place on the at least one column on the first view of the data table, and indicating selection of the column. Additionally, in some embodiments, reducing the first horizontal width further includes reducing a horizontal width of a header inscription in all other columns in the data table. Further, in some embodiments, the method can include selecting at least one header inscription style to be utilized in reducing the first horizontal width of the header inscription. Also, in some embodiments, displaying the second view of the data table further includes displaying the header inscription having the second horizontal width as at least one of multiple lines, vertically, diagonally at an angle to the horizontal line of the data table, smaller character size, and narrower character type.

According to another embodiment, a computer-based method for reducing a horizontal width of a header inscription of a column in a data table includes: displaying a first view of a data table, the data table having at least a plurality of columns, wherein at least one column includes a cell containing a header inscription having a first horizontal width; selecting at least one column including a header inscription having a first horizontal width; selecting a header inscription style to be utilized in reducing the horizontal width of the header inscription; reducing the first horizontal width of the header inscription of the at least one column to a second horizontal width, the second horizontal width being less than the first horizontal width; and displaying a second view of the data table, wherein the header inscription of the at least one selected column has the second horizontal width.

According to another embodiment, a computer-based method for reducing a horizontal width of a header inscription of a column in a data table includes: displaying a first view of a data table, the data table having at least a plurality of columns, wherein at least one column includes a cell containing a header inscription having a first horizontal width; selecting at least one column including a header inscription having a first horizontal width; displaying a first graphical user interface, the first graphical user interface providing at least one option for the selection of the header inscription of the at least one column to be reduced in horizontal width; selecting at least one option on the first graphical user interface; displaying a second graphical user interface, the second graphical user interface providing at least one option for the selection of a header inscription style to be utilized in reducing the horizontal width of the header inscription of the at least one selected column; reducing the first horizontal width of the header inscription of the at least one selected column to a second horizontal width, the second horizontal width being less than the first horizontal width; and displaying a second view of the data table, wherein the header inscription of the at least one column has the second horizontal width.

The present invention also provides computer program products for reducing the horizontal width of a header inscription of a column in a data table. A computer program product includes a medium configured to store or transport computer-readable instructions or in which computer-readable instructions can be embedded.

According to another embodiment of the present invention, a computer program product for reducing a horizontal width of a header inscription of a column in a data table has computer-readable instructions for a method that includes: displaying a first view of a data table, the data table having at least a plurality of columns, wherein at least one column includes a cell containing a header inscription having a first horizontal width; selecting at least one column including a header inscription having a first horizontal width; reducing the first horizontal width of the header inscription of the at least one column to a second horizontal width, the second horizontal width being less than the first horizontal width; and displaying a second view of the data table, wherein the header inscription of the at least one column has the second horizontal width.

According to another embodiment, a computer program product for reducing a horizontal width of a header inscription of a column in a data table has computer-readable instructions for a method that includes: displaying a first view of a data table, the data table having at least a plurality of columns, wherein at least one column includes a cell containing a header inscription having a first horizontal width; selecting at least one column including a header inscription having a first horizontal width; selecting a header inscription style to be utilized in reducing the horizontal width of the header inscription; reducing the first horizontal width of the header inscription of the at least one column to a second horizontal width, the second horizontal width being less than the first horizontal width; and displaying a second view of the data table, wherein the header inscription of the at least one selected column has the second horizontal width.

According to another embodiment, a computer program product for reducing a horizontal width of a header inscription of a column in a data table has computer-readable instructions for a method that includes: displaying a first view of a data table, the data table having at least a plurality of columns, wherein at least one column includes a cell containing a header inscription having a first horizontal width; selecting at least one column including a header inscription having a first horizontal width; displaying a first graphical user interface, the first graphical user interface providing at least one option for the selection of the header inscription of the at least one column to be reduced in horizontal width; selecting at least one option on the first graphical user interface; displaying a second graphical user interface, the second graphical user interface providing at least one option for the selection of a header inscription style to be utilized in reducing the horizontal width of the header inscription of the at least one selected column; reducing the first horizontal width of the header inscription of the at least one selected column to a second horizontal width, the second horizontal width being less than the first horizontal width; and displaying a second view of the data table, wherein the header inscription of the at least one column has the second horizontal width.

The present invention further provides computer systems for reducing the horizontal width of a header inscription of a column in a data table. The computer systems include: a processor; and a memory coupled to the processor, and having stored therein computer code for one or more methods for reducing a horizontal width of a header inscription of a column in a data table, wherein upon execution of the computer code on the processor, the method reduces the horizontal width of the header inscription.

According to another embodiment of the present invention, a computer system includes: a processor; and a memory coupled to the processor, and having stored therein computer code for a method for reducing a horizontal width of a header inscription of a column in a data table, wherein upon execution of the computer code on the processor, the method includes: displaying a first view of a data table, the data table having at least a plurality of columns, wherein at least one column includes a cell containing a header inscription having a first horizontal width; selecting at least one column including a header inscription having a first horizontal width; reducing the first horizontal width of the header inscription of the at least one column to a second horizontal width, the second horizontal width being less than the first horizontal width; and displaying a second view of the data table, wherein the header inscription of the at least one column has the second horizontal width.

According to another embodiment of the present invention, a computer system includes: a processor; and a memory coupled to the processor, and having stored therein computer code for a method for reducing a horizontal width of a header inscription of a column in a data table, wherein upon execution of the computer code on the processor, the method includes: displaying a first view of a data table, the data table having at least a plurality of columns, wherein at least one column includes a cell containing a header inscription having a first horizontal width; selecting at least one column including a header inscription having a first horizontal width; selecting a header inscription style to be utilized in reducing the horizontal width of the header inscription; reducing the first horizontal width of the header inscription of the at least one column to a second horizontal width, the second horizontal width being less than the first horizontal width; and displaying a second view of the data table, wherein the header inscription of the at least one selected column has the second horizontal width.

According to another embodiment of the present invention, a computer system includes: a processor; and a memory coupled to the processor, and having stored therein computer code for a method for reducing a horizontal width of a header inscription of a column in a data table, wherein upon execution of the computer code on the processor, the method includes: displaying a first view of a data table, the data table having at least a plurality of columns, wherein at least one column includes a cell containing a header inscription having a first horizontal width; selecting at least one column including a header inscription having a first horizontal width; displaying a first graphical user interface, the first graphical user interface providing at least one option for the selection of the header inscription of the at least one column to be reduced in horizontal width; selecting at least one option on the first graphical user interface; displaying a second graphical user interface, the second graphical user interface providing at least one option for the selection of a header inscription style to be utilized in reducing the horizontal width of the header inscription of the at least one selected column; reducing the first horizontal width of the header inscription of the at least one selected column to a second horizontal width, the second horizontal width being less than the first horizontal width; and displaying a second view of the data table, wherein the header inscription of the at least one column has the second horizontal width.

The present invention also provides various means for implementing the present invention. According to one embodiment of the present invention, a method for reducing a horizontal width of a column header inscription includes: means for displaying a first view of a data table, the data table having at least a plurality of columns, wherein at least one column includes a cell containing a header inscription having a first horizontal width; means for selecting at least one column including a header inscription having a first horizontal width; means for reducing the first horizontal width of the header inscription of the at least one column to a second horizontal width, the second horizontal width being less than the first horizontal width; and means for displaying a second view of the data table, wherein the header inscription of the at least one column has the second horizontal width.

In some embodiments, means for reducing the first horizontal width further includes means for reducing a horizontal width of a header inscription in all other columns in the data table. Additionally, in some embodiments, means for displaying the second view of the data table further includes means for displaying the header inscription having the second horizontal width as at least one of multiple lines, vertically, diagonally at an angle to the horizontal line of the data table, smaller character size, and narrower character type.

Further, in some embodiments, means for selecting at least one column including a header inscription having a first horizontal width further includes means for positioning a cursor over any portion of the at least one column on the first view of the data table; and means for indicating selection of the column.

BRIEF DESCRIPTION OF THE DRAWINGS

FIG. 1 illustrates an example of a conventional data table found in the prior art;

FIG. 4A illustrates one example of a first view of a data table in which a column header inscription having a first horizontal width is selected for reduction of the horizontal width utilizing a multiple line header inscription style according to one embodiment of the present invention;

FIG. 4B illustrates one example of a second view of the data table of FIG. 4A in which the column header inscription has a reduced second horizontal width using a multiple line header inscription style according to one embodiment of the present invention;

FIG. 5A illustrates one example of a first view of a data table in which all the column header inscriptions, each having a first horizontal width, are selected for reduction of the horizontal width utilizing a vertical style according to one embodiment of the present invention;

FIG. 5B illustrates one example of a second view of the data table of FIG. 5A in which all the column header inscriptions each have a reduced second horizontal width using a vertical header inscription style according to one embodiment of the present invention;

FIG. 6A illustrates one example of a first view of a data table in which all the column header inscriptions, each having a first horizontal width, are selected for reduction of the horizontal width utilizing a diagonal style according to one embodiment of the present invention;

FIG. 6B illustrates one example of a second view of the data table of FIG. 6A in which all the column header inscriptions each have a reduced second horizontal width using a diagonal header inscription style according to one embodiment of the present invention;

FIG. 7A illustrates one example of a first view of a data table in which all the column header inscriptions, each having a first horizontal width, are selected for reduction of the horizontal width utilizing a smaller character size according to one embodiment of the present invention;

FIG. 7B illustrates one example of a second view of the data table of FIG. 7A in which all the column header inscriptions each have a reduced second horizontal width using a smaller character size header inscription style according to one embodiment of the present invention;

FIG. 8A illustrates one example of a first view of a data table in which all the column header inscriptions, each having a first horizontal width, are selected for reduction of the horizontal width utilizing a narrower character type header inscription style according to one embodiment of the present invention;

FIG. 8B illustrates one example of a second view of the data table of FIG. 8A in which all the column header inscriptions each have a reduced second horizontal width using a narrower character type header inscription style according to one embodiment of the present invention;

FIGS. 11A through 11D illustrate examples of display screen views and graphical user interfaces presented to a user in implementing the method of FIG. 10 according to one embodiment of the present invention.

DETAILED DESCRIPTION

Embodiments of the present invention provide methods, products and systems that enable a user to reduce the horizontal width of a column header inscription in a data table by selecting a desired column at any location on the column. In some embodiments, the user can select whether to reduce the horizontal width of the header inscription of a selected column, a group of columns, or all columns in the data table. Further, in some embodiments, the user can select the header inscription style(s) to be used in reducing the horizontal width of the header inscription(s).

As explained more clearly below, the user modifies the header inscription without having to locate and select either the actual header inscription or the cell containing the header inscription. Also, the user does not have to move the cursor from the header inscription or header inscription cell to an associated location on a task bar. Hence, the number of operations required to reduce the horizontal width of a column header inscription compared to the prior art technique have been reduced.

Figure 2:
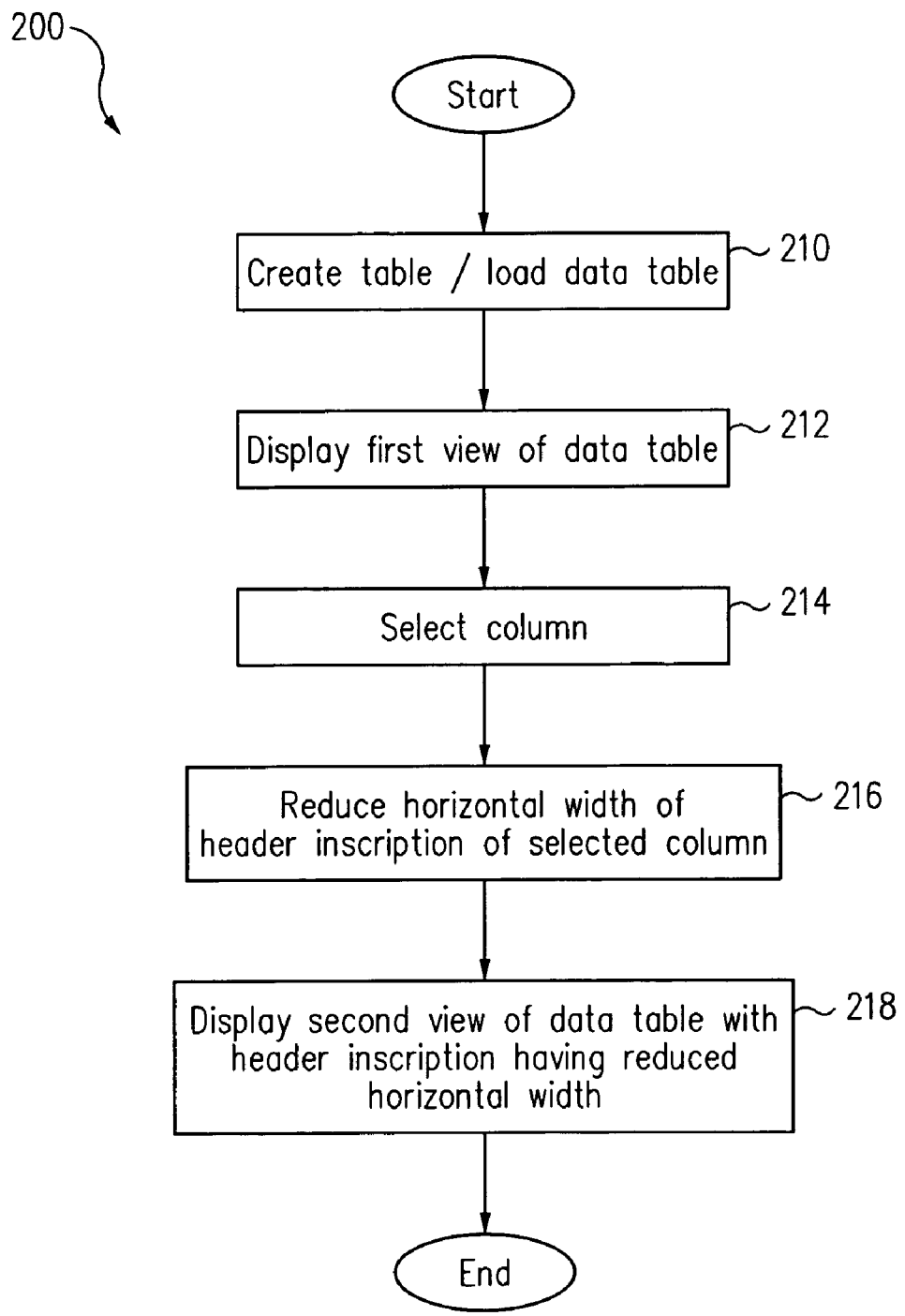
FIG. 2 illustrates a process flow chart of a method for reducing the horizontal width of a column header inscription according to one embodiment of the present invention.

FIG. 2 illustrates a process flow chart of a method for reducing the horizontal width of a column header inscription according to one embodiment of the present invention. For ease of description, the display of data tables, graphical user interfaces, cursors and/or other indicators, are discussed in relation to display on a display screen, such as a cathode ray tube (CRT), associated with a computer system. However, it can be appreciated by those of skill in the art that the display of these constructs can be on any of a variety of viewing media associated with systems that permit implementation of the various embodiments of the present invention.

According to method 200, in operation 210, a data table is created or loaded into a system including a display to enable the viewing of the data table. While the data table can contain both rows and columns, the presence of rows is not required.

In operation 212, a first view of the data table is displayed on a display screen. The data table includes at least one column having a header inscription with a first horizontal width.

After display of the first view of the data table, in operation 214, a user selects at least one column having a header inscription of a first horizontal width to be reduced. In one example, using an input device, such as a mouse, a user can move a cursor on the display screen to any place on the desired column, and then indicate selection of the column according to a predefined operation, such as by clicking the right button on the mouse, to select the column.

Following selection of the at least one column, in operation 216, the first horizontal width of the header inscription is reduced to a second horizontal width, the second horizontal width being less than the first horizontal width. In one example, the header inscription is reduced in horizontal width by altering the display/output parameters associated with the header inscription so that the header inscription is displayed with reduced horizontal width. In some embodiments, the header inscription can be reduced in horizontal width by displaying the header inscription in multiple lines, vertically, diagonally (at an angle to the horizontal direction of the data table), with smaller character size, or with narrower character type, or a combination of any of these header inscription styles. These header inscription styles are further described herein with reference to FIGS. 4A through 8B.

Assuming the widest horizontal data in the column defines the column width, reduction in the horizontal width of the header inscription can also effect adjustment of the column width.

After reduction of the horizontal width of the header inscription of the at least one column, in operation 218, a second view of the data table is displayed on the display screen in which the header inscription of the at least one column has a reduced second horizontal width.

In some instances, such as for aesthetic appearance of the data table, it may be desirable to reduce the horizontal width of header inscriptions of all the columns in the data table in the same manner as the selected column. Thus, the present invention also provides for further embodiments in which selection of a single column reduces the horizontal width of the header inscriptions of all the columns in the data table.

Figure 3:
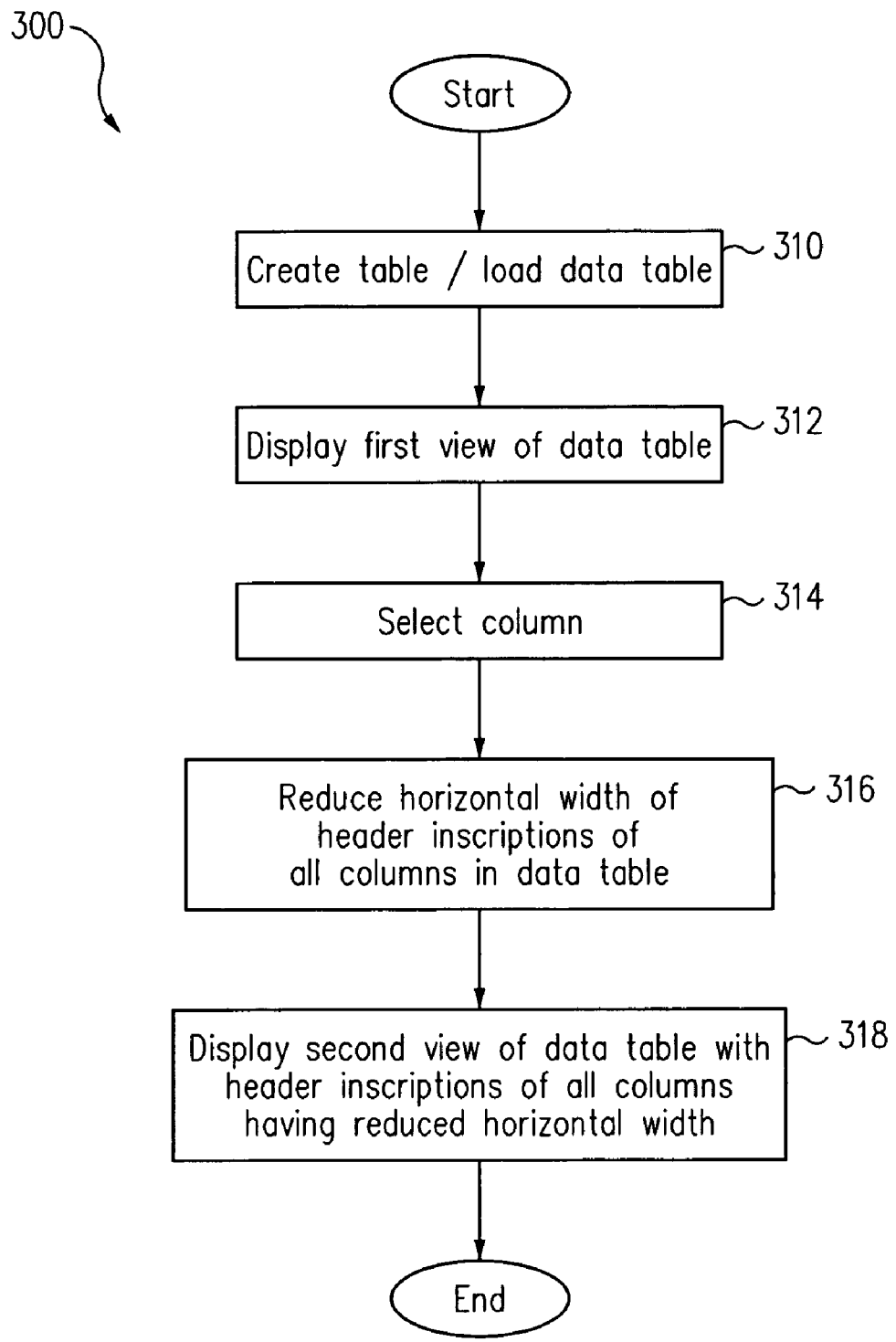
FIG. 3 illustrates a process flow chart of a method for reducing the horizontal width of a column header inscription in which the selection of a single column for reducing the horizontal width of the header inscription reduces the horizontal width of the header inscriptions of all the columns in the data table according to another embodiment of the present invention.

FIG. 3 illustrates a process flow chart of a method for reducing the horizontal width of a column header inscription in which the selection of a single column for reducing the horizontal width of the header inscription reduces the horizontal width of the header inscriptions of all the columns in the data table according to another embodiment of the present invention. According to method 300, operations 310 through 314 are accomplished as earlier described with reference, respectively, to operations 210 through 214 of FIG. 2.

Following selection of a column, in operation 316, the header inscriptions of all the columns in the data table are reduced in horizontal width. Reduction of the horizontal widths of the header inscriptions is effected as earlier described with reference to operation 216 of FIG. 2. Each of the header inscriptions can have different first horizontal widths as well as different reduced second horizontal widths. Also, assuming the widest horizontal data in each of the columns defines each of the column widths, reduction in the horizontal widths of the header inscriptions can effect adjustment of the column widths.

After reduction of the horizontal widths of the header inscriptions, in operation 318, a second view of the data table is displayed on the display screen in which the header inscriptions of all the columns in the data table are displayed having reduced second horizontal widths.

In alternate embodiments of the present invention, some of the columns, rather than one column or all columns, can be selected for reduction of the horizontal width of the header inscriptions. In one embodiment, a group of adjacent columns can be selected for reduction of the horizontal width of the header inscriptions. For example, after placing a cursor at any place on a first desired column, the user can indicate, e.g., highlight, additional adjacent columns for selection by holding down a left button on a mouse and dragging the cursor across the other columns to be selected. Release of the button selects the columns.

In another embodiment, a group of individually selected columns, that may or may not be adjacent, can be selected for reduction of the horizontal width of the header inscriptions. For example, after placing a cursor at any place on a first desired column, the user can hold down a specified key, such as a control key or shift key, and click a left button of the mouse to indicate, e.g., highlight, that column to be selected. While still depressing the specified key, the user then moves the cursor to the next desired column and clicks the left button to indicate that column for selection in addition to the first column. The user could repeat this process until the group of desired columns are indicated. The release of the specified key would select the indicated columns. It can be appreciated by those of skill in the art that other multiple item selection techniques can also be used.

As earlier described with reference to FIG. 2 and 3, according to the present invention, the reduction of the horizontal width of the header inscriptions can be effected utilizing a variety of header inscription styles. Various embodiments of these header inscription styles are discussed herein with reference to FIGS. 4A through 8B. It can be appreciated by those of skill in the art that combinations of any of these header inscription styles can also be utilized.

FIG. 4A illustrates one example of a first view of a data table in which a column header inscription having a first horizontal width is selected for reduction of the horizontal width utilizing a multiple line header inscription style according to one embodiment of the present invention. In the present illustration, a first view of a data table, data table 410A, is displayed. When the user places cursor 404 at any place on column 414_5 and performs a predefined operation to select the column, such as clicking a right button on a mouse, operations 214 and 216 are performed, and the first horizontal width 420A of header inscription 418A is reduced to a second horizontal width.

FIG. 4B illustrates one example of a second view of the data table of FIG. 4A in which the column header inscription has a reduced second horizontal width using a multiple line header inscription style according to one embodiment of the present invention. Following performance of operations 214 and 216, a second view of the data table, data table 410B, is displayed in which the header inscription 418B has a reduced second horizontal width 420B using a multiple line header inscription style. Also, assuming the widest horizontal data in each of the columns defines each of the column widths, the reduced second horizontal width of header inscription 418B can effect adjustment of the width of column 414_5 as illustrated.

FIG. 5A illustrates one example of a first view of a data table in which all the column header inscriptions, each having a first horizontal width, are selected for reduction of the horizontal width utilizing a vertical style according to one embodiment of the present invention. In the present illustration, a first view of a data table, data table 510A, is displayed. When the user places cursor 504 at any place on any of the columns, for example column 514_2, and performs a predefined operation to select all the columns, such as clicking a right button on a mouse, operations 314 and 316 are performed, and the first horizontal width 520A of header inscription 518A and each of the first horizontal widths of all the other header inscriptions, are reduced in horizontal width.

FIG. 5B illustrates one example of a second view of the data table of FIG. 5A in which all the column header inscriptions each have a reduced second horizontal width using a vertical header inscription style according to one embodiment of the present invention. Following performance of operations 314 and 316, a second view of the data table, data table 510B, is displayed in which the header inscription 518B has a reduced second horizontal width 520B and all the other column header inscriptions each have a reduced second horizontal width using a vertical header inscription style. Also, assuming the widest horizontal data in each of the columns defines each of the column widths, the reduced second horizontal widths of header inscription 518B and all the other header inscriptions can effect adjustment of the widths of columns 514_1 through 515_5 as illustrated.

FIG. 6A illustrates one example of a first view of a data table in which all the column header inscriptions, each having a first horizontal width, are selected for reduction of the horizontal width utilizing a diagonal style according to one embodiment of the present invention. In the present illustration, a first view of a data table, data table 610A, is displayed. When the user places cursor 604 at any place on any of the columns, for example column 614_5, and performs a predefined operation to select all the columns, such as clicking a right button on a mouse, operations 314 and 316 are performed, and the first horizontal width 620A of header inscription 618A is reduced to a second horizontal width and each of the first horizontal widths of all the other header inscriptions, are reduced in horizontal width.

FIG. 6B illustrates one example of a second view of the data table of FIG. 6A in which all the column header inscriptions each have a reduced second horizontal width using a diagonal header inscription style according to one embodiment of the present invention. Following performance of operations 314 and 316, a second view of the data table, data table 610B, is displayed in which the header inscription 618B has a reduced second horizontal width 620B and all the other column header inscriptions each have a reduced second horizontal width using a diagonal header inscription style. Also, assuming the widest horizontal data in each of the columns defines each of the column widths, the reduced second horizontal widths of header inscription 618B and all the other header inscriptions can effect adjustment of the widths of columns 614_1 through 615_5 as illustrated.

FIG. 7A illustrates one example of a first view of a data table in which all the column header inscriptions, each having a first horizontal width, are selected for reduction of the horizontal width utilizing a smaller character size according to one embodiment of the present invention. In the present illustration, a first view of a data table, data table 710A, is displayed. When the user places cursor 704 at any place on any of the columns, for example column 714_1, and performs a predefined operation to select all the columns, such as clicking a right button on a mouse, operations 314 and 316 are performed, and the first horizontal width 720A of header inscription 718A and each of the first horizontal widths of all the other header inscriptions, are reduced in horizontal width.

FIG. 7B illustrates one example of a second view of the data table of FIG. 7A in which all the column header inscriptions each have a reduced second horizontal width using a smaller character size header inscription style according to one embodiment of the present invention. Following performance of operations 314 and 316, a second view of the data table, data table 710B, is displayed in which the header inscription 718B has a reduced second horizontal width 720B and all the other column header inscriptions each have a reduced second horizontal width using a smaller character size header inscription style. Also, assuming the widest horizontal data in each of the columns defines each of the column widths, the reduced second horizontal widths of header inscription 718B and all the other header inscriptions can effect adjustment of the widths of columns 714_1 through 715_5 as illustrated.

FIG. 8A illustrates one example of a first view of a data table in which all the column header inscriptions, each having a first horizontal width, are selected for reduction of the horizontal width utilizing a narrower character type header inscription style according to one embodiment of the present invention. In the present illustration, a first view of a data table, data table 810A, is displayed. When the user places cursor 804 at any place on any of the columns, for example column 814_5, and performs a predefined operation to select all the columns, such as clicking a right button on a mouse, operations 314 and 316 are performed, and the first horizontal width 820A of header inscription 818A and each of the first horizontal widths of all the other header inscriptions, are reduced in horizontal width.

FIG. 8B illustrates one example of a second view of the data table of FIG. 8A in which all the column header inscriptions each have a reduced second horizontal width using a narrower character type header inscription style according to one embodiment of the present invention. Following performance of operations 314 and 316, a second view of the data table, data table 810B, is displayed in which the header inscription 818B has a reduced second horizontal width 820B and all the other column header inscriptions each have a reduced second horizontal width using a narrower character type header inscription style. Also, assuming the widest horizontal data in each of the columns defines each of the column widths, the reduced second horizontal widths of header inscription 818B and all the other header inscriptions can effect adjustment of the widths of columns 814_1 through 815_5 as illustrated.

It can be appreciated by those of skill in the art that any of the header inscription styles can be applied to a selected column, some columns or all columns, and are not limited to the embodiments described with reference to FIGS. 4A through 8B.

As earlier described with reference to FIGS. 2 through 8B, reduction of the horizontal width of a header inscription can be effected utilizing a variety of header inscription styles provided by the present invention. In some instances, it may be desirable to enable a user to select among the various header inscription styles utilized in reducing the horizontal width of a header inscription. Thus, the present invention also provides for further embodiments in which a user is able to select one or more header inscriptions styles to be utilized in reducing the horizontal width of header inscriptions.

Figure 9:
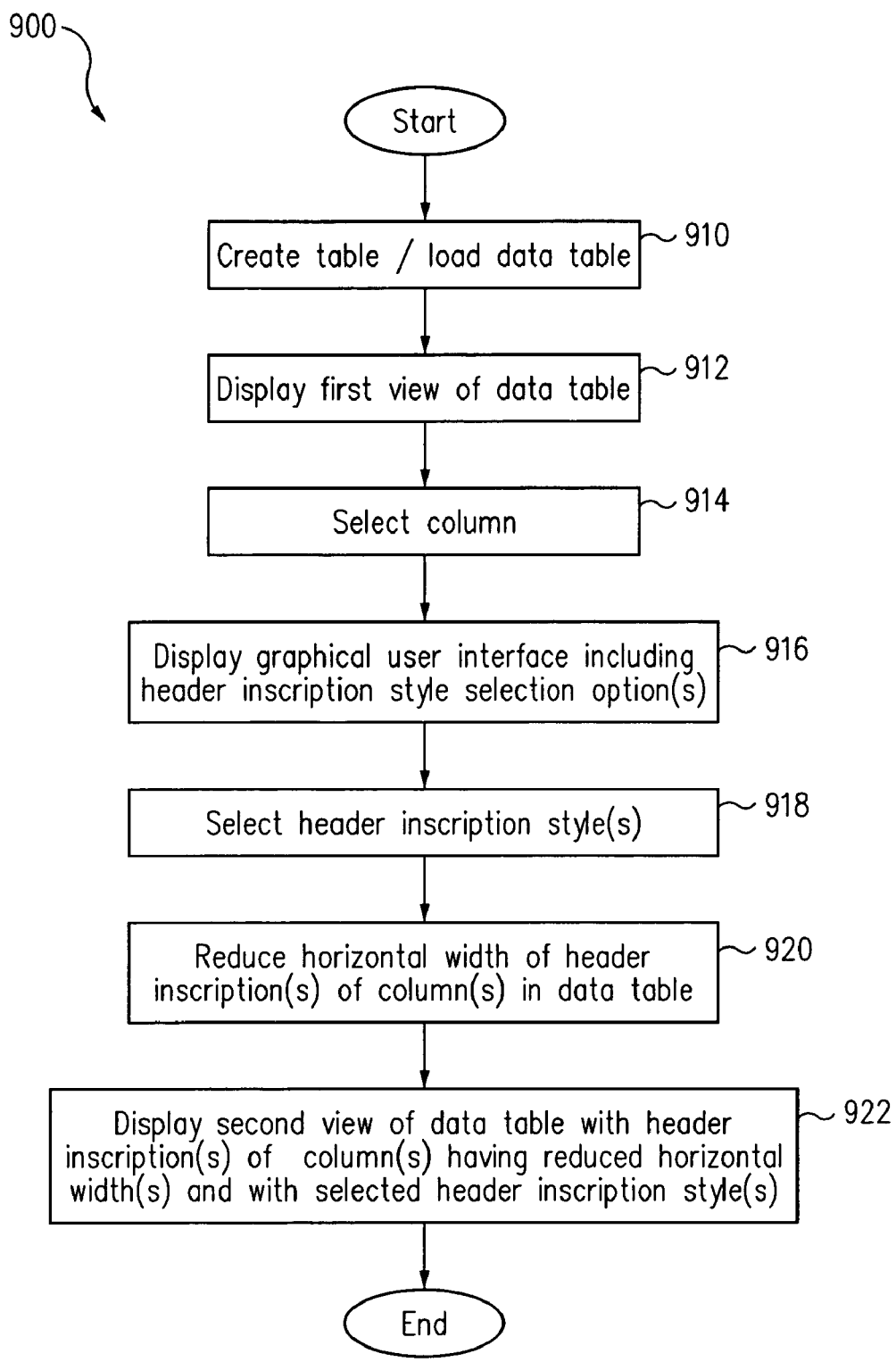
FIG. 9 illustrates a process flow chart of a method for reducing the horizontal width of a column header inscription in which the header inscription style utilized in reducing the horizontal width of one or more header inscription(s) is user selectable, according to one embodiment of the present invention.

FIG. 9 illustrates a process flow chart of a method for reducing the horizontal width of a column header inscription in which the header inscription style utilized in reducing the horizontal width of one or more header inscription(s) is user selectable, according to one embodiment of the present invention. According to method 900, operations 910 through 914 are executed similar either to operations 210 through 214 of FIG. 2, where only the header inscription of the selected column is reduced in horizontal width, or to operations 310 through 314 of FIG. 3, where the header inscriptions of all columns in the data table are reduced in horizontal width.

Following selection of the column(s), in operation 916, a graphical user interface is displayed to the user allowing the user to select one or a combination of header inscription styles to be utilized in reducing the horizontal width of the selected column(s). The graphical user interface can be a pop-up menu that is displayed to the user so that the user does not have to move far from the position he/she is currently working at in the data table. The graphical user interface provides user-selectable header inscription style options that permit the user to select or de-select each of the style options. In one example, the header inscription styles can be some or all of those described with reference to FIGS. 4A through 8B.

After viewing the style options, in operation 918, the user selects one or more header inscription styles on the graphical user interface to be applied in reducing the horizontal width of the selected header inscriptions. Selection of the styles can be effected by the user by further selecting an "OK" option, or other confirmation indicator.

In operation 920, the header inscription of the selected column, or columns, in the data table, dependent upon the implementation of operations 910 through 914, is reduced in horizontal width. Assuming the widest horizontal data in the column defines the column width, reduction in the horizontal width of the header inscription can effect adjustment of the column width(s).

Upon reduction of the horizontal width(s) of the header inscription(s), in operation 922, a second view of the data table is displayed on the display screen in which the header inscription of the selected column(s) in the data table is displayed having reduced horizontal width in accordance with the header inscription style(s) selected by the user at operation 918.

Figure 10:
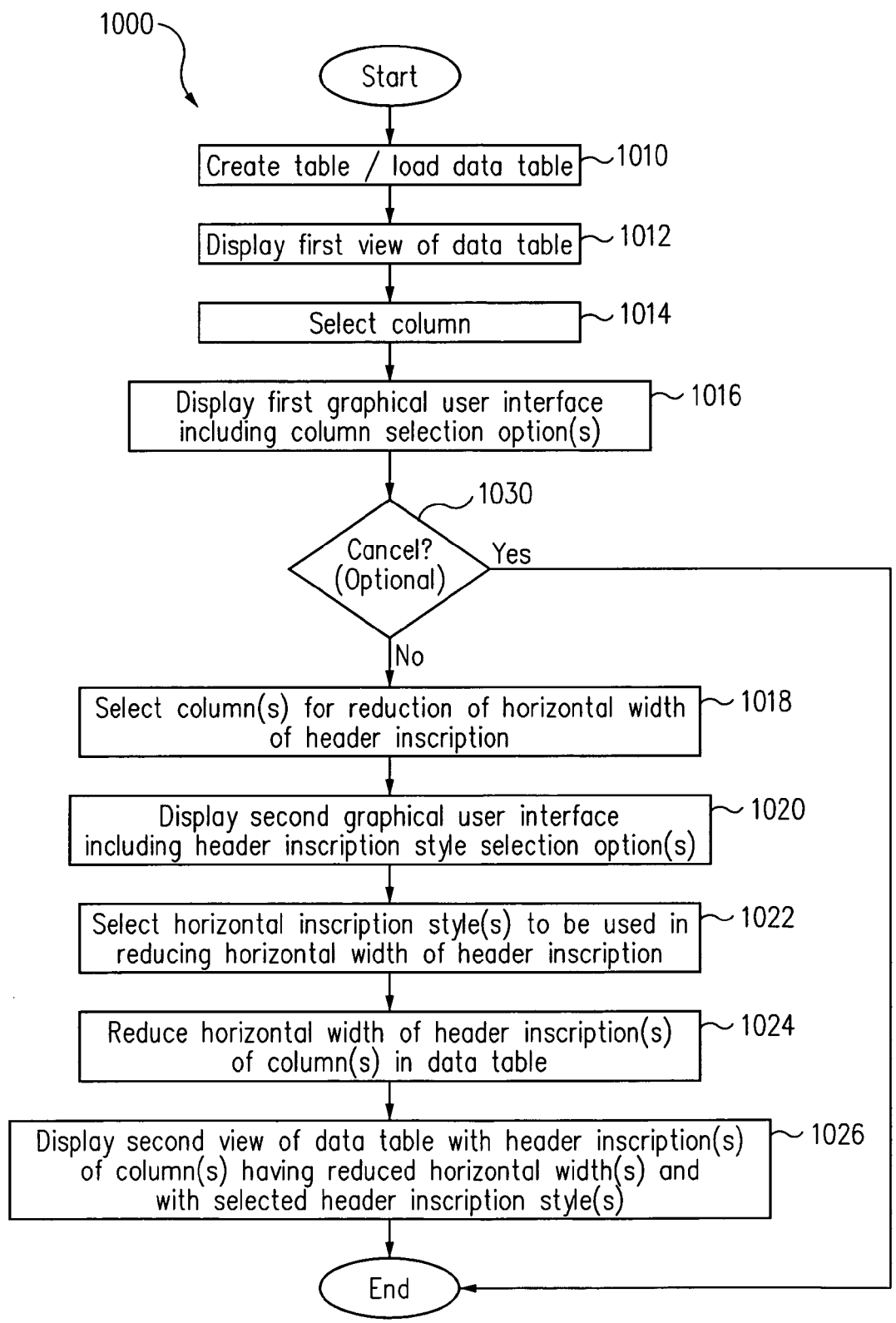
FIG. 10 illustrates a process flow chart of one embodiment of a method for reducing the horizontal width of column header inscriptions in a data table in which a user selects whether the reduction is applied to the selected column or all columns in the data table and the style of the header inscription used in reducing the horizontal width, according to one embodiment of the present invention.

FIGS. 2 through 9 illustrated various embodiments of the present invention that can be separately utilized or combined to effect various process flows that result in the ability of a user to reduce the horizontal width of a column header inscription(s) in a data table in accordance with the present invention. FIGS. 10 and 11A through 11D illustrate one embodiment of the present invention which provides a user with the ability to input user preferences as to the reduction of the horizontal width of header inscriptions in a data table. FIG. 10 illustrates a process flow chart of the method, while FIGS. 11A through 11D depict different display views presented to a user in implementing the method of FIG. 10, both according to one embodiment of the present invention.

FIG. 10 illustrates a process flow chart of one embodiment of a method for reducing the horizontal width of column header inscriptions in a data table in which a user selects whether the reduction is applied to the selected column or all columns in the data table and the style of the header inscription used in reducing the horizontal width, according to one embodiment of the present invention. According to method 1000, at operation 1010, a data table is created or loaded into a system associated with a display to enable the viewing of the data table.

In operation 1012, a first view of the data table is displayed on a display screen of a display monitor. For example, in FIG. 11A, the first view of the data table is presented as data table 1110 on a display (not shown). As illustrated, the data table 1110A contains rows 1112_1 through 1112_6, and columns 1114_1 through 1114_6. Each of the columns 1114_1 through 1114_6 contain a cell having a header inscription. For example, column 1114_4 includes a header inscription 1118A.

Data table 1110A illustrates an example of a data table in which the header inscriptions are not located at the ends of columns, but are located elsewhere in the column.

In operation 1014, a user selects a column to reduce the horizontal width of the header inscription. For example, in FIG. 11A, it is initially determined to reduce the first horizontal width 1120A of header inscription 1118A. Cursor 1104 is positioned at any point on column 1114_4, and column 1114_4 is selected by performance of a predefined operation, such as by clicking the right button on a mouse.

In operation 1016, the selection of a column results in the display of a first graphical user interface. The first graphical user interface provides selection options as to whether the horizontal width of the headers inscription is to be reduced in the selected column or in all columns of the data table.

For example, in FIG. 11B, a first graphical user interface presented as a pop-up column selection menu 1130 is displayed to the user. In the present example, the pop-up column selection menu 1130 lists various column selection options available to the user. Option 1132 permits a user to reduce the horizontal width of the header inscription of the selected column, and option 1134 permits a user to reduce the horizontal width of the header inscriptions of all the columns in the data table. Option 1136, while not a required option, permits a user to exit the menu 1130 and, consequently, method 1000. For example, in FIG. 11B, in operation 1030, if the cancel option 1136 was selected, the method 1000 would end.

If the method 1000 is not exited, in operation 1018, the user selects a column option. For example, in FIG. 11B, option 1134, reduce header inscription of all columns, is selected. Thus, first horizontal width 1120A of header inscription 1118A and the first horizontal widths of each of the other header inscriptions in the data table 1110A are selected.

In the present example, selection of options 1132 or 1134, selects the identified column(s) and automatically effects operation 1020, the display of a second graphical user interface. Thus, in other embodiments, an "OK" option, or similar confirmatory option, can be included to provide the user an opportunity to consider the selection(s) made in the first graphical user interface prior to presentation of the second graphical user interface or exit from the process.

Following column selection, in operation 1020, a second graphical user interface is displayed to the user providing header inscription style options to be utilized in reducing the horizontal width of the header inscription(s).

Figure 11A:
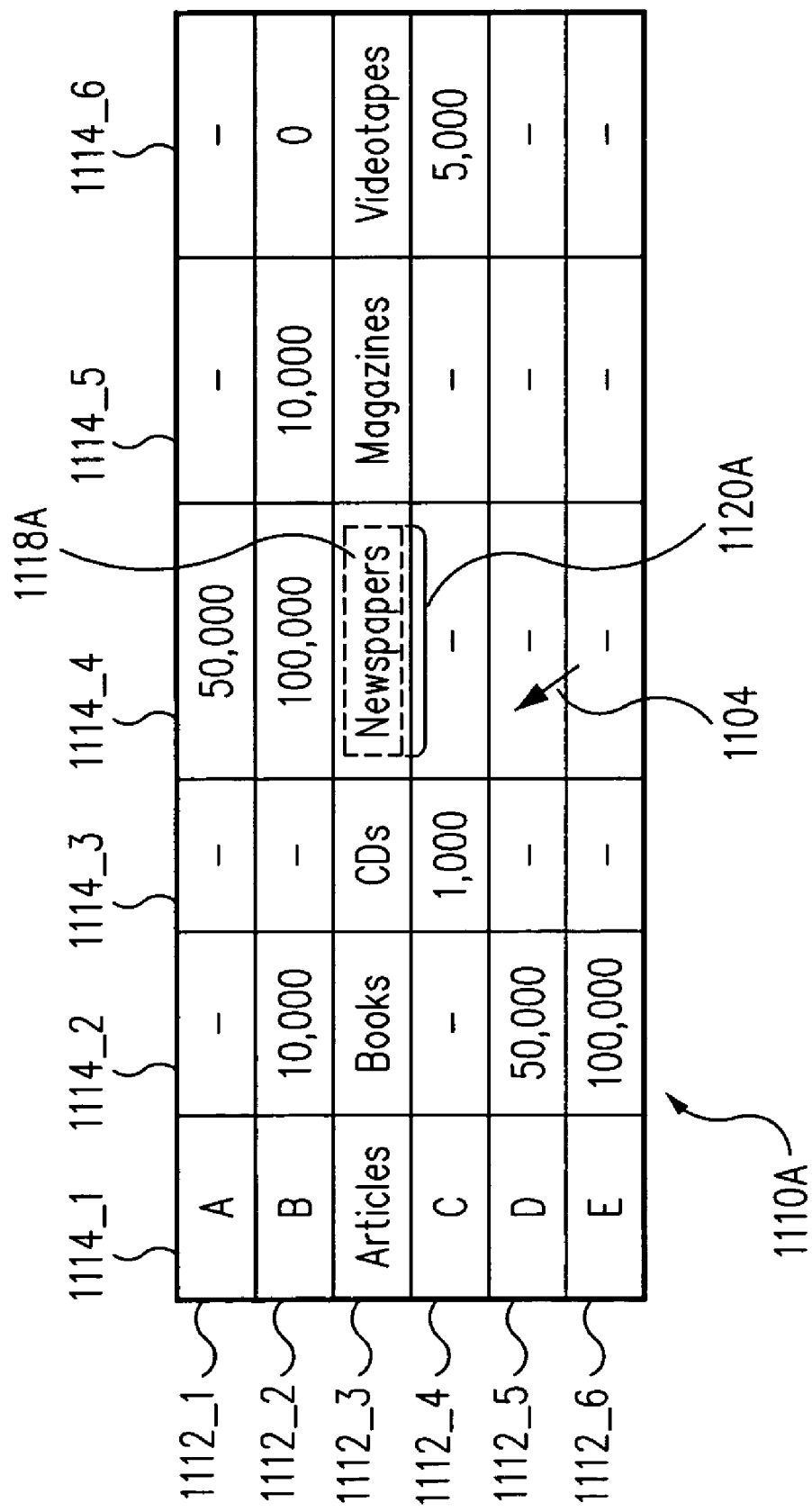
Figure 11C:
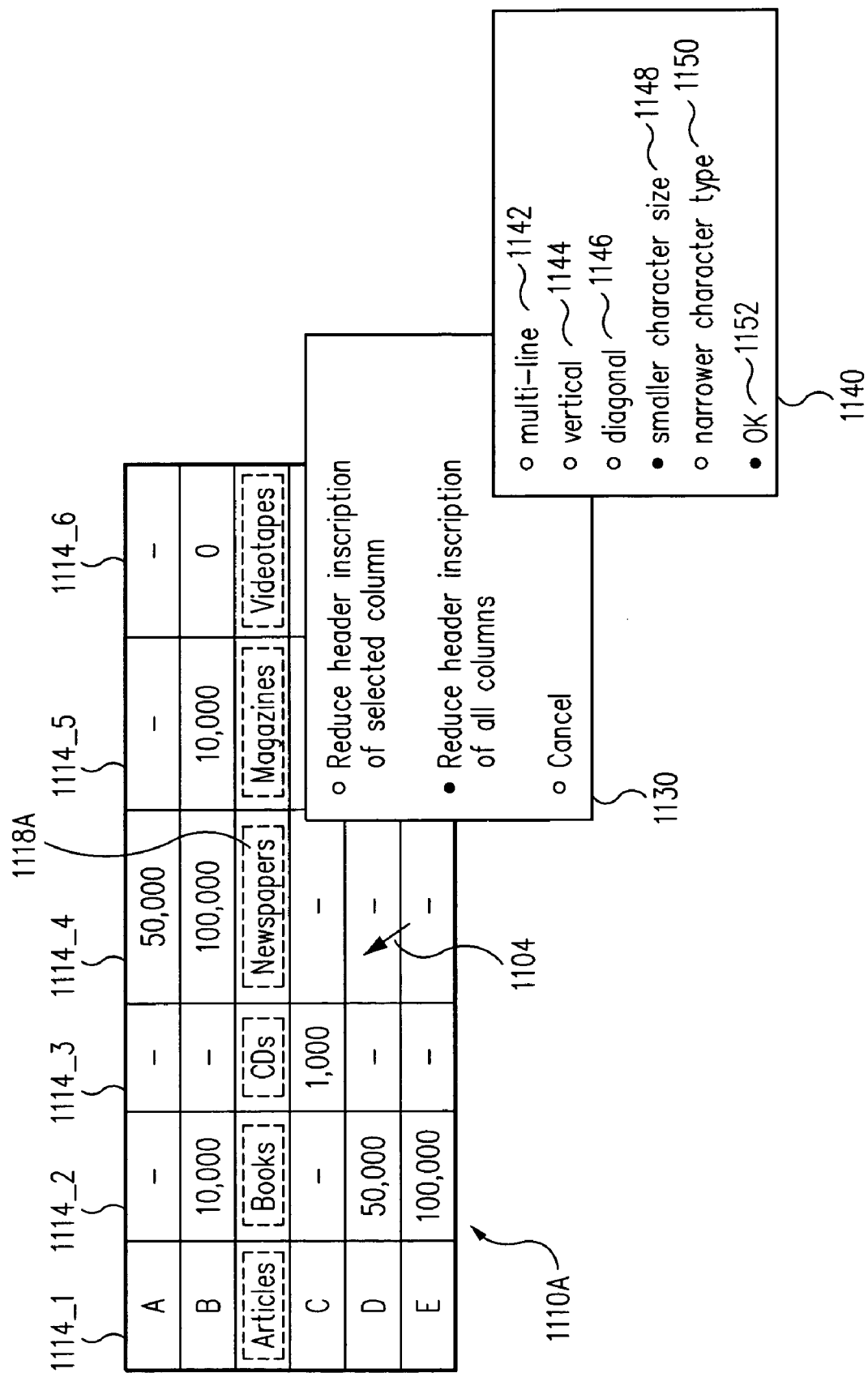

For example, in FIG. 11C, a second graphical user interface presented as pop-up header inscription style menu 1140 is displayed to the user.

Option 1142 permits a user to select the use of a multiple line header inscription style in reducing the horizontal width of the header inscription of the selected column, earlier illustrated with reference to FIG. 4B. Option 1144, permits selection of the vertical header inscription style, earlier illustrated with reference to FIG. 5B. Option 1146 permits selection of the diagonal header inscription style, earlier illustrated with reference to FIG. 6B. Option 1148 permits selection of smaller character size, earlier illustrated with reference to FIG. 7B. Option 1150 permits selection of narrower character type, earlier illustrated with reference to FIG. 8B.

As the user can select any or a combination of the options 1142 through 1150, option 1152, "OK", is provided to effect the selection(s) made by the user. If so desired, a cancel option, as described with reference to pop-up column selection menu 1130, can also be provided to permit a user to exit the process.

Following display of the second graphical user interface, in operation 1022, the user selects one or a combination of header inscription styles to be utilized in reducing the horizontal width of the header inscription(s). As earlier described at operation 1020, the user can select any or a combination of the options 1142 through 1150 and then selects option 1152, "OK", to effect the selections made. In the present example, option 1148, a smaller character size, is selected to be used in reducing the horizontal width of the header inscriptions of all the columns, as well as option 1152 to effect the selection.

Following selection of the header inscription style(s) (and the confirmatory option 1152), in operation 1024, the header inscription of the selected column(s) in the data table is reduced in horizontal width in accordance with the user's selections. Assuming the widest horizontal data in the column defines the column width, reduction in the horizontal width of the header inscription can effect adjustment of the column width. Thus, the first horizontal width 1120A of header inscription 1118A as well as each of the first horizontal widths of all the other header inscriptions in the data table 1110A are reduced using a smaller character size header inscription style.

In operation 1026, a second view of the data table is displayed on the display screen in which the header inscriptions of the selected columns in the data table are displayed having reduced horizontal widths in accordance with the user selections made at operations 1018 and 1022.

Figure 11D:
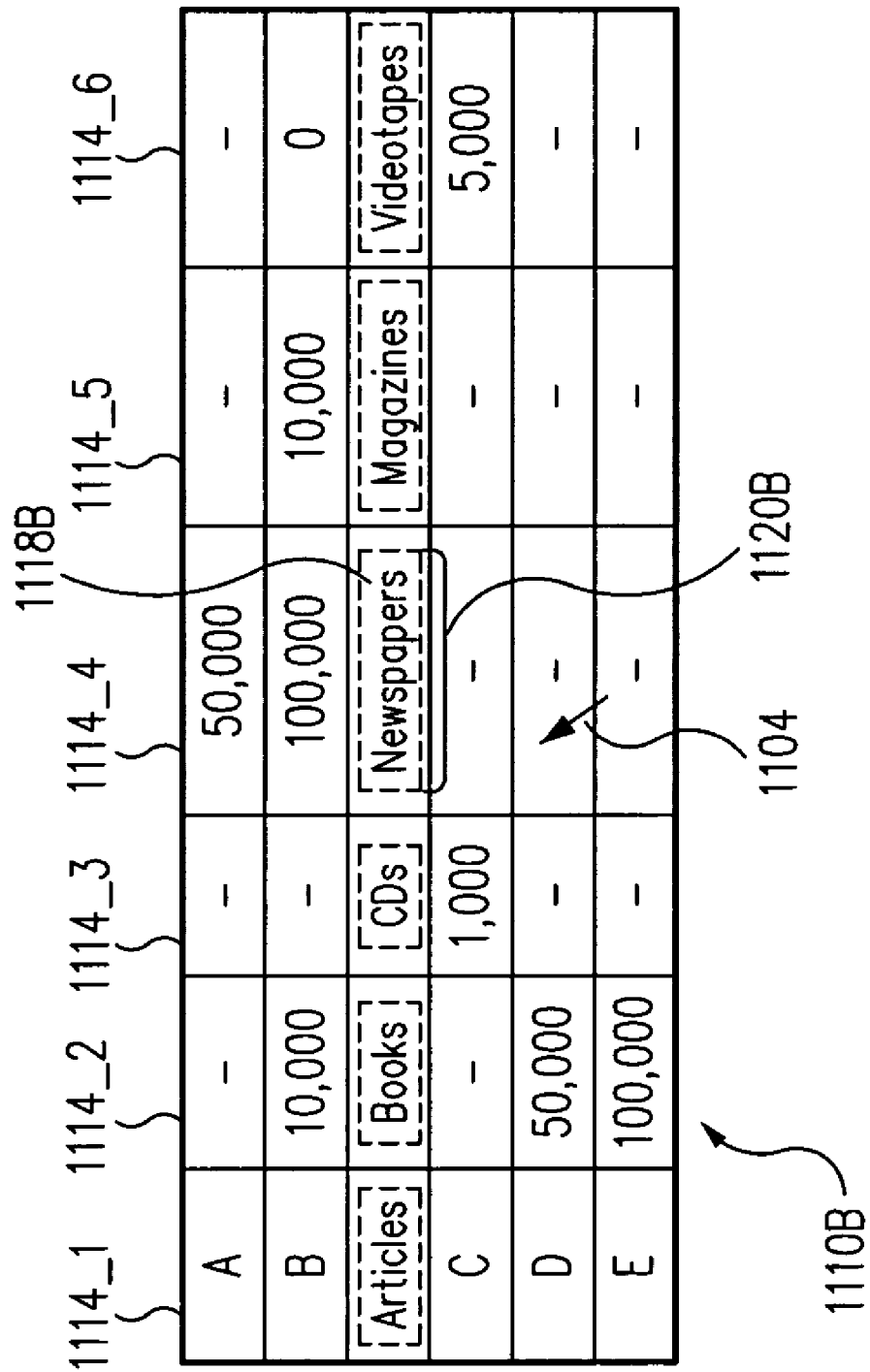

For example, in FIG. 11D, a second view of the data table, data table 1110B, is displayed in which header inscription 1118B has a reduced second horizontal width 1120B and all of the other header inscriptions in the data table 1110B have reduced second horizontal widths, all with a smaller character size header inscription style.

Figure 12:
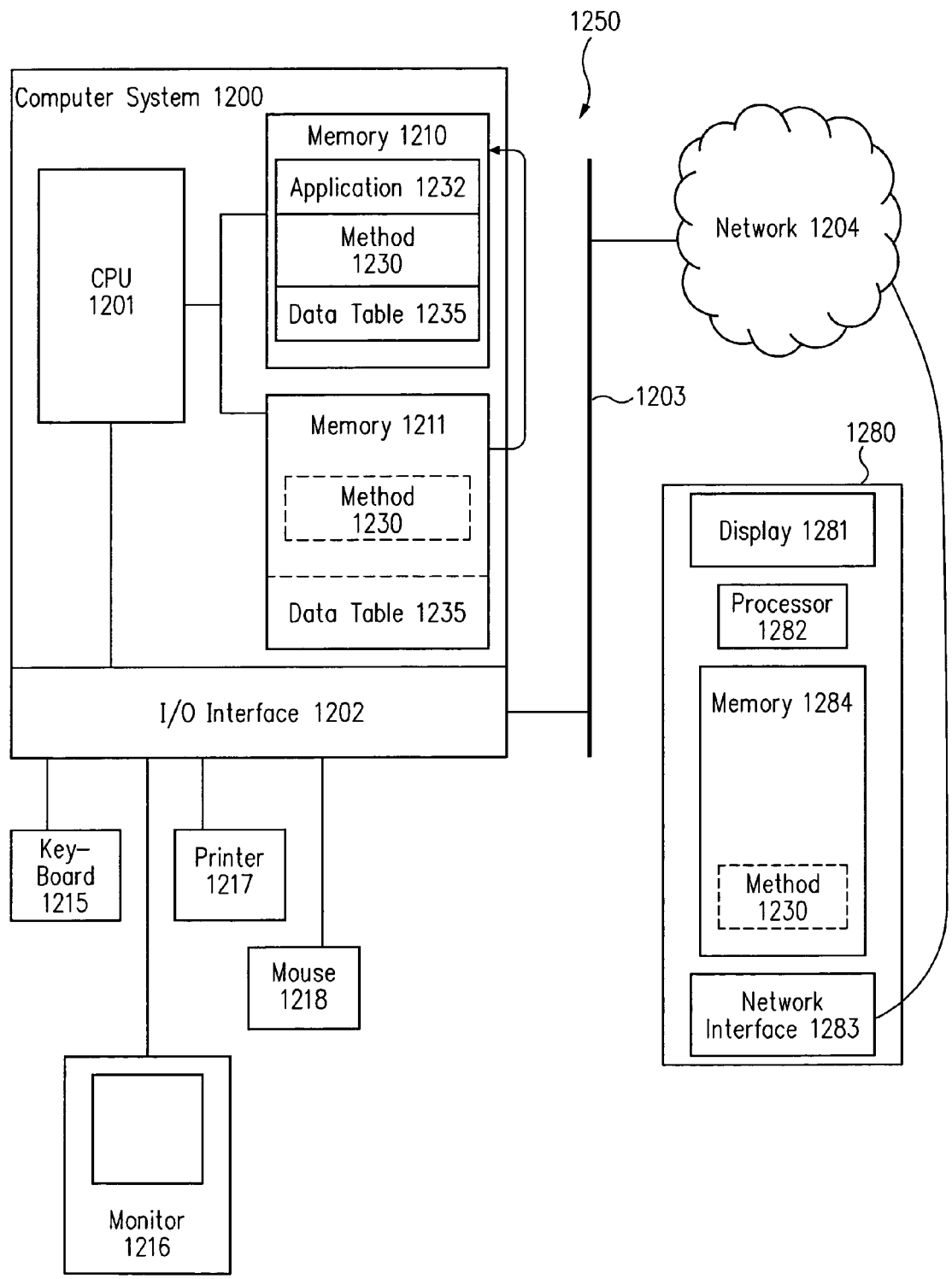
FIG. 12 is a block diagram of a computer system in which the present invention can be implemented.

The present invention can be implemented in a variety of ways, including as a stand-alone system, such as a personal computer or workstation, as illustrated schematically in FIG. 12 by computer system 1200. The present invention can also be implemented in a client-server configuration 1250 that is also illustrated in FIG. 12. The data table created and/or stored in memory 1211 on computer system 1200 or in memory 1284 on server computer 1280. The data table can be displayed on a display screen of client device 1200, such as display monitor 1216, while some or all operations of methods 200, 300, 900, and 1000, herein designated as method 1230, are carried out on a server computer 1280 accessible by the client device 1200 over a data network 1204, such as the Internet, using a browser application or the like. Method 1230 can include one, some, or all of the methods 200, 300, 900, and 1000 as described herein.

Herein, a computer program product comprises a medium configured to store or transport computer-readable instructions, such as program code, for method 1230, or in which computer-readable instructions for method 1230 is stored. Some examples of computer program products are CD-ROM discs, ROM cards, floppy discs, magnetic tapes, computer hard drives, servers on a network and signals transmitted over a network representing computer-readable instructions.

Further herein, a means for performing a particular function is accomplished using the appropriate computer-readable instructions and the related hardware necessary to performing the function.

As illustrated in FIG. 12, this storage medium can belong to computer system 1200 itself. However, the storage medium also can be removed from computer system 1200. For example, method 1230 can be stored in memory 1284 that is physically located in a location different from processor 1201. The only requirement is that processor 1201 is coupled to the memory containing method 1230. This could be accomplished in a client-server system 1250, e.g., system 1200 is the client and system 1280 is the server, or alternatively via a connection to another computer via modems and analog lines, or digital interfaces and a digital carrier line.

For example, memory 1284 could be in a World Wide Web portal, while display unit 1216 and processor 1201 are in a personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 1200, in one embodiment, can be a portable computer, a workstation, a two-way pager, a cellular telephone, a digital wireless telephone, a personal digital assistant, a server computer, an Internet appliance, or any other device that includes the components shown and that can execute method 1230. Similarly, in another embodiment, computer system 1200 can be comprised of multiple different computers, wireless devices, cellular telephones, digital telephones, two-way pagers, or personal digital assistants, server computers, or any desired combination of these devices that are interconnected to perform, method 1230 as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In view of this disclosure, method 1230 can be implemented in a wide variety of computer system configurations. In addition, method 1230 could be stored as different modules in memories of different devices. For example, method 1230 could initially be stored in a server computer 1280, and then as necessary, a module of method 1230 could be transferred to a client device 1200 and executed on client device 1200. Consequently, part of method 1230 would be executed on the server processor 1282, and another part of method 1230 would be executed on processor 1201 of client device 1200. In view of this disclosure, those of skill in the art can implement the invention in a wide-variety of physical hardware configurations using an operating system and computer programming language of interest to the user. For example, FIG. 12 shows input devices 1215 and 1218, but other input devices, such as speech recognition software and/or hardware could be used to input the selections and data for method 1230.

In yet another embodiment, method 1230 is stored in memory 1284 of system 1280. Stored method 1230 is transferred, over network 1204 to memory 1211 in system 1200. In this embodiment, network interface 1283 and I/O interface 1202 would include analog modems, digital modems, or a network interface card. If modems are used, network 1204 includes a communications network, and method 1230 is downloaded via the communications network.

Method 1230 can be implemented in a computer program including comprehensive office application STAROFFICE that is available from Sun Microsystems, Inc. of Palo Alto, Calif. (STAROFFICE is a trademark of Sun Microsystems.) Such a computer program can be stored on any common data carrier like, for example, a floppy disk or a compact disc (CD), as well as on any common computer system's storage facilities like hard disks. Therefore, an embodiment of the present invention also relates to a data carrier for storing a computer program for carrying out the inventive method. Another embodiment of the present invention relates to a method for using a computer system for carrying out the presented inventive method. Yet another embodiment of the present invention relates to a computer system with a storage medium on which a computer program for carrying out the presented inventive method is stored.

While the invention has been particularly shown with reference to an embodiment thereof, it can be understood by those skilled in the art that various other changes in the form and details can be made therein without departing from the spirit and scope of the invention.

I claim:

1. A computer-based method for reducing a horizontal width of a header inscription of a column in a data table, the method comprising:
    displaying a first view of a data table, the data table having at least a plurality of columns, wherein at least one column includes a cell containing a header inscription having a first horizontal width;
    selecting at least one column including a header inscription having a first horizontal width in the first view of the data table;
    automatically displaying, in response to the selecting at least one column, a first list including a plurality of header inscription reduction options;
    selecting at least one header inscription reduction option in the first list;
    automatically displaying, in response to the selecting at least one header inscription reduction option, a second list including a plurality of header inscription style options;
    selecting at least one header inscription style option in the second list, wherein said at least one header inscription style option is sufficient to completely define a second horizontal width of the header inscription of the at least one column, the second horizontal width being less than the first horizontal width;
    automatically reducing the first horizontal width of the header inscription of the at least one column to a second horizontal width upon selection of at least one header inscription style option in the second list, the second horizontal width being less than the first horizontal width; and
    automatically displaying a second view of the data table, wherein the header inscription of the at least one column has the second horizontal width.

2. The method of claim 1, wherein automatically reducing the first horizontal width further comprises:
    automatically reducing a first horizontal width of a header inscription in all other columns in the data table to a second horizontal width upon selection of a reduce header inscription of all columns option in the first list.

3. The method of claim 1, wherein automatically displaying the second view of the data table further comprises:

automatically displaying the header inscription having the second horizontal width in multiple lines upon selection of a multi-line header inscription style option in the second list.

4. The method of claim 1, wherein automatically displaying the second view of the data table further comprises:
automatically displaying the header inscription having the second horizontal width vertically upon selection of a vertical header inscription style option in the second list.

5. The method of claim 1, wherein automatically displaying the second view of the data table further comprises:
automatically displaying the header inscription having the second horizontal width diagonally at an angle to the horizontal line of the data table upon selection of a diagonal header inscription style option in the second list.

6. The method of claim 1, wherein automatically displaying the second view of the data table further comprises:
automatically displaying the header inscription having the second horizontal width with smaller character size upon selection of a smaller character size header inscription style option in the second list.

7. The method of claim 1, wherein automatically displaying the second view of the data table further comprises:
automatically displaying the header inscription having the second horizontal width with narrower character type upon selection of a narrower character type header inscription style option in the second list.

8. The method of claim 1, wherein automatically displaying the second view of the data table further comprises:
automatically displaying the header inscription having the second horizontal width as at least one of multiple lines, vertically, diagonally at an angle to the horizontal line of the data table, smaller character size, and narrower character type upon selection of at least one header inscription style option in the second list.

9. The method of claim 1, wherein selecting at least one column including a header inscription having a first horizontal width further comprises:
positioning a cursor at any place on the at least one column in the first view of the data table; and indicating selection of the column.

10. A computer-based method for reducing a horizontal width of a header inscription of a column in a data table, the method comprising:
displaying a first view of a data table, the data table having at least a plurality of columns, wherein at least one column includes a cell containing a header inscription having a first horizontal width;
selecting at least one column including a header inscription having a first horizontal width in the first view of the data table;
automatically displaying, in response to the selecting at least one column, a list including a plurality of header inscription style options;
selecting at least one header inscription style option in the list to be utilized in reducing the first horizontal width of the header inscription, wherein said at least one header inscription style option is sufficient to completely define a second horizontal width of the header inscription of the at least one column, the second horizontal width being less than the first horizontal width;
automatically reducing the first horizontal width of the header inscription of the at least one column to a second horizontal width upon selection of the at least one header inscription style option in the list, the second horizontal width being less than the first horizontal width; and
automatically displaying a second view of the data table, wherein the header inscription of the at least one selected column has the second horizontal width.

11. The method of claim 10, wherein automatically displaying the second view of the data table further comprises:
automatically displaying the header inscription having the second horizontal width as at least one of multiple lines, vertically, diagonally at an angle to the horizontal line of the data table, smaller character size, and narrower character type upon selection of the at least one header inscription style option.

12. The method of claim 10, wherein selecting at least one column including a header inscription having a first horizontal width further comprises:
positioning a cursor at any place on the at least one column in the first view of the data table; and
indicating selection of the column.

13. A computer-based method for reducing a horizontal width of a header inscription of a column in a data table, the method comprising:
displaying a first view of a data table, the data table having at least a plurality of columns, wherein at least one column includes a cell containing a header inscription having a first horizontal width;
selecting at least one column including a header inscription having a first horizontal width in the first view of the data table;
automatically displaying, upon selection of the at least one column, a first graphical user interface, the first graphical user interface including a plurality of header inscription reduction options;
selecting at least one header inscription reduction option in the first graphical user interface;
automatically displaying, in response to the selecting at least one header inscription reduction option, a second graphical user interface, the second graphical user interface including a plurality of header inscription style options to be utilized in reducing the first horizontal width of the header inscription of the at least one selected column;
selecting at least one header inscription style option in the second graphical user interface, wherein said at least one header inscription style option is sufficient to completely define a second horizontal width of the header inscription of the at least one column, the second horizontal width being less than the first horizontal width;
automatically reducing the first horizontal width of the header inscription of the at least one selected column to a second horizontal width upon selection of the at least one header inscription style option in the second graphical user interface, the second horizontal width being less than the first horizontal width; and
automatically displaying a second view of the data table, wherein the header inscription of the at least one column has the second horizontal width.

14. The method of claim 13, wherein automatically displaying the second view of the data table further comprises:
automatically displaying the header inscription having the second horizontal width as at least one of multiple lines, vertically, diagonally at an angle to the horizontal line of the data table, smaller character size, and narrower character type upon selection of at least one header inscription style option in the second graphical user interface.

15. The method of claim 13, wherein selecting at least one column including a header inscription having a first horizontal width further comprises:
  positioning a cursor at any place on the at least one column in the first view of the data table; and
  indicating selection of the column.

16. A computer program product for reducing a horizontal width of a header inscription of a column in a data table, the computer program product having stored computer-readable instructions for implementing a method comprising:
  displaying a first view of a data table, the data table having at least a plurality of columns, wherein at least one column includes a cell containing a header inscription having a first horizontal width;
  selecting at least one column including a header inscription having a first horizontal width in the first view of the data table;
  automatically displaying, in response to the selecting at least one column, a first list including a plurality of header inscription reduction options;
  selecting at least one header inscription reduction option in the first list;
  automatically displaying, in response to the selecting at least one header inscription reduction option, a second list including a plurality of header inscription style options;
  selecting at least one header inscription style option in the second list, wherein said at least one header inscription style option is sufficient to completely define a second horizontal width of the header inscription of the at least one column, the second horizontal width being less than the first horizontal width;
  automatically reducing the first horizontal width of the header inscription of the at least one column to a second horizontal width upon selection of the at least one header inscription style option in the second list, the second horizontal width being less than the first horizontal width; and
  automatically displaying a second view of the data table, wherein the header inscription of the at least one column has the second horizontal width.

17. The computer program product of claim 16, wherein automatically reducing the first horizontal width further comprises:
  automatically reducing a first horizontal width of a header inscription in all other columns in the data table to a second horizontal width upon selection of a reduce header inscription of all columns option in the first list.

18. The computer program product of claim 16, wherein selecting at least one column including a header inscription having a first horizontal width further comprises:
  positioning a cursor at any place on the at least one column in the first view of the data table; and
  indicating selection of the column.

19. The computer program product of claim 16, wherein automatically displaying the second view of the data table further comprises:
  automatically displaying the header inscription having the second horizontal width as at least one of multiple lines, vertically, diagonally at an angle to the horizontal line of the data table, smaller character size, and narrower character type upon selection of at least one header inscription style option in the second list.

20. A computer program product for reducing a horizontal width of a header inscription of a column in a data table, the computer program product having stored computer-readable instructions for implementing a method comprising:
  displaying a first view of a data table, the data table having at least a plurality of columns, wherein at least one column includes a cell containing a header inscription having a first horizontal width;
  selecting at least one column including a header inscription having a first horizontal width in the first view of the data table;
  automatically displaying, in response to the selecting at least one column, a list including a plurality of header inscription style options;
  selecting at least one header inscription style option in the list to be utilized in reducing the first horizontal width of the header inscription, wherein said at least one header inscription style option is sufficient to completely define a second horizontal width of the header inscription of the at least one column, the second horizontal width being less than the first horizontal width;
  automatically reducing the first horizontal width of the header inscription of the at least one column to a second horizontal width upon selection of the at least one header inscription style option in the list, the second horizontal width being less than the first horizontal width; and
  automatically displaying a second view of the data table, wherein the header inscription of the at least one selected column has the second horizontal width.

21. A computer program product for reducing a horizontal width of a header inscription of a column in a data table, the computer program product having stored computer-readable instructions for implementing a method comprising:
  displaying a first view of a data table, the data table having at least a plurality of columns, wherein at least one column includes a cell containing a header inscription having a first horizontal width;
  selecting at least one column including a header inscription having a first horizontal width in the first view of the data table;
  automatically displaying, upon selection of the at least one column, a first graphical user interface, the first graphical user interface including a plurality of header inscription reduction options;
  selecting at least one header inscription reduction option in the first graphical user interface;
  automatically displaying, in response to the selecting at least one header inscription reduction option, a second graphical user interface, the second graphical user interface including a plurality of header inscription style options to be utilized in reducing the first horizontal width of the header inscription of the at least one selected column;
  selecting at least one header inscription style option in the second graphical user interface, wherein said at least one header inscription style option is sufficient to completely define a second horizontal width of the header inscription of the at least one column, the second horizontal width being less than the first horizontal width;
  automatically reducing the first horizontal width of the header inscription of the at least one selected column to a second horizontal width upon selection of the at least one header inscription style option in the second graphical user interface, the second horizontal width being less than the first horizontal width; and automatically displaying a second view of the data table, wherein the header inscription of the at least one column has the second horizontal width.

22. A computer system comprising:

a processor; and a memory coupled to the processor, and having stored therein computer code for a method for reducing a horizontal width of a header inscription of a column in a data table, wherein upon execution of the computer code on the processor, the method comprises:

displaying a first view of a data table, the data table having at least a plurality of columns, wherein at least one column includes a cell containing a header inscription having a first horizontal width;

selecting at least one column including a header inscription having a first horizontal width in the first view of the data table;

automatically displaying, in response to the selecting at least one column, a first list including a plurality of header inscription reduction options;

selecting at least one header inscription reduction option in the first list;

automatically displaying, in response to the selecting at least one header inscription reduction option, a second list including a plurality of header inscription style options;

selecting at least one header inscription style option in the second list, wherein said at least one header inscription style option is sufficient to completely define a second horizontal width of the header inscription of the at least one column, the second horizontal width being less than the first horizontal width;

automatically reducing the first horizontal width of the header inscription of the at least one column to a second horizontal width upon selection of the at least one header inscription style option in the second list, the second horizontal width being less than the first horizontal width; and automatically displaying a second view of the data table, wherein the header inscription of the at least one column has the second horizontal width.

23. A computer system comprising:

a processor; and a memory coupled to the processor, and having stored therein computer code for a method for reducing a horizontal width of a header inscription of a column in a data table, wherein upon execution of the computer code on the processor, the method comprises:

displaying a first view of a data table, the data table having at least a plurality of columns, wherein at least one column includes a cell containing a header inscription having a first horizontal width;

selecting at least one column including a header inscription having a first horizontal width in the first view of the data table;

automatically displaying, in response to the selecting at least one column, a list including a plurality of header inscription style options;

selecting at least one header inscription style option in the list to be utilized in reducing the first horizontal width of the header inscription, wherein said at least one header inscription style option is sufficient to completely define a second horizontal width of the header inscription of the at least one column, the second horizontal width being less than the first horizontal width;

automatically reducing the first horizontal width of the header inscription of the at least one column to a second horizontal width upon selection of the at least one header inscription style option in the list, the second horizontal width being less than the first horizontal width; and automatically displaying a second view of the data table, wherein the header inscription of the at least one selected column has the second horizontal width.

24. A computer system comprising:

a processor; and a memory coupled to the processor, and having stored therein computer code for a method for reducing a horizontal width of a header inscription of a column in a data table, wherein upon execution of the computer code on the processor, the method comprises:

displaying a first view of a data table, the data table having at least a plurality of columns, wherein at least one column includes a cell containing a header inscription having a first horizontal width;

selecting at least one column including a header inscription having a first horizontal width in the first view of the data table;

automatically displaying, upon selection of the at least one column, a first graphical user interface, the first graphical user interface including a plurality of header inscription reduction options;

selecting at least one header inscription reduction option in the first graphical user interface;

automatically displaying, in response to the selecting at least one header inscription reduction option, a second graphical user interface, the second graphical user interface including a plurality of header inscription style options to be utilized in reducing the first horizontal width of the header inscription of the at least one selected column;

selecting at least one header inscription style option in the second graphical user interface, wherein said at least one header inscription style option is sufficient to completely define a second horizontal width of the header inscription of the at least one column, the second horizontal width being less than the first horizontal width;

automatically reducing the first horizontal width of the header inscription of the at least one selected column to a second horizontal width upon selection of the at least one header inscription style option in the second graphical user interface, the second horizontal width being less than the first horizontal width; and automatically displaying a second view of the data table, wherein the header inscription of the at least one column has the second horizontal width.

25. A computer system for reducing a horizontal width of a column header inscription, the computer system comprising:

means for displaying a first view of a data table, the data table having at least a plurality of columns, wherein at least one column includes a cell containing a header inscription having a first horizontal width;

means for selecting at least one column including a header inscription having a first horizontal width in the first view of the data table;

means for automatically displaying, in response to the selecting at least one column, a list including a plurality of header inscription style options;

means for selecting at least one header inscription style option in the list to be utilized in reducing the first horizontal width of the header inscription, wherein said at least one header inscription style option is sufficient to completely define a second horizontal width of the header inscription of the at least one column, the second horizontal width being less than the first horizontal width;

means for automatically reducing the first horizontal width of the header inscription of the at least one column to a second horizontal width upon selection of the at least one header inscription style option in the list, the second horizontal width being less than the first horizontal width; and means for automatically displaying a second view of the data table, wherein the header inscription of the at least one selected column has the second horizontal width.

26. The computer system of claim 25, wherein the means for automatically reducing the first horizontal width further comprises:

means for automatically reducing a first horizontal width of a header inscription in all other columns in the data table to a second horizontal width.

27. The computer system of claim 25, wherein the means for automatically reducing the first horizontal width of the header inscription of the at least one column to a second horizontal width comprises:

means for displaying the header inscription having the second horizontal width in multiple lines upon a selection of a multi-line header inscription style option in the list.

28. The computer system of claim 25, wherein the means for automatically reducing the first horizontal width of the header inscription of the at least one column to a second horizontal width comprises:

means for displaying the header inscription having the second horizontal width vertically upon a selection of a vertical header inscription style option in the list.

29. The computer system of claim 25, wherein the means for automatically reducing the first horizontal width of the header inscription of the at least one column to a second horizontal width comprises:

means for displaying the header inscription having the second horizontal width diagonally at an angle to the horizontal line of the data table upon a selection of a diagonal header inscription style option in the list.

30. The computer system of claim 25, wherein the means for automatically reducing the first horizontal width of the header inscription of the at least one column to a second horizontal width comprises:

means for displaying the header inscription having the second horizontal width with smaller character size upon a selection of a smaller character size header inscription style option in the list.

31. The computer system of claim 25, wherein the means for automatically reducing the first horizontal width of the header inscription of the at least one column to a second horizontal width comprises:

means for displaying the header inscription having the second horizontal width with narrower character type upon a selection of a narrower character type header inscription style option in the list.

32. The computer system of claim 25, wherein the means for automatically reducing the first horizontal width of the header inscription of the at least one column to a second horizontal width comprises:

means for displaying the header inscription having the second horizontal width as at least one of multiple lines, vertically, diagonally at an angle to the horizontal line of the data table, smaller character size, and narrower character type upon a selection of at least one header inscription style option in the list.

33. The computer system of claim 25, wherein selecting at least one column including a header inscription having a first horizontal width further comprises:

means for positioning a cursor at any place on the at least one column in the first view of the data table; and means for indicating selection of the column.

34. The computer system of claim 25, further comprising:

means for automatically displaying another list including a plurality of header inscription reduction options; and means for selecting at least one header inscription reduction option in the another list.

35. The computer system of claim 34, further comprising:

means for automatically reducing a first horizontal width of a header inscription in all other columns in the data table to a second horizontal width upon selection of a reduce header inscription of an all columns option in the another list.

* * * * *